United States Patent [19]

Peters et al.

[11] 4,088,865
[45] May 9, 1978

[54] LASER BEAM WELDING APPARATUS

[75] Inventors: George T. Peters, Farmington, Conn.; Gorken Melikian, Springfield, Mass.; Frank R. Biancardi, South Windsor, Conn.

[73] Assignee: United Technologies Corporation, Hartford, Conn.

[21] Appl. No.: 646,054

[22] Filed: Jan. 2, 1976

[51] Int. Cl.$^2$ .............................................. B23K 26/00
[52] U.S. Cl. ................................ 219/121 L; 219/60 A
[58] Field of Search .............. 219/60 R, 60 A, 121 L, 219/121 LM

[56] References Cited

U.S. PATENT DOCUMENTS

| 3,483,352 | 12/1969 | Schollhammer | 219/60 A |
| 3,528,424 | 9/1970 | Ayres | 219/121 L |
| 3,535,489 | 10/1970 | Hinrichs | 219/60 A |
| 3,808,394 | 4/1974 | Mominee et al. | 219/121 LM |
| 3,870,849 | 3/1975 | Rygiol | 219/60 A |
| 3,943,324 | 3/1976 | Haggerty | 219/121 L |
| 3,953,706 | 4/1976 | Harris et al. | 219/121 L |
| 4,001,543 | 1/1977 | Bove et al. | 219/121 L |

FOREIGN PATENT DOCUMENTS

| 136,491 | 8/1960 | U.S.S.R. | 219/60 R |
| 223,231 | 11/1968 | U.S.S.R. | 219/60 A |

OTHER PUBLICATIONS

Ball et al., "Welding With a High-Power $CO_2$ Laser", Society of Automotive Engineers Publication #740863, 10/1974.

Primary Examiner—J. V. Truhe
Assistant Examiner—Clifford C. Shaw
Attorney, Agent, or Firm—Prutzman, Hayes, Kalb & Chilton

[57] ABSTRACT

Welding apparatus featuring a right angle beam handling tube for directing a fixed laser beam from an entrance to the tube to a rotatably supported output reflector in a focus head mounted on an outlet of the tube. The tube has upstream and downstream duct sections which are independently extendible and retractable relative to their juncture, the juncture and a laser beam translating mirror mounted therein being movable only in a linear direction coincident with the incoming beam axis along the upstream duct section to ensure beam alignment with the entrance and outlet of the right angle beam handling tube while permitting the distances therebetween to vary to selectively position the focus head relative to a workpiece.

13 Claims, 3 Drawing Figures

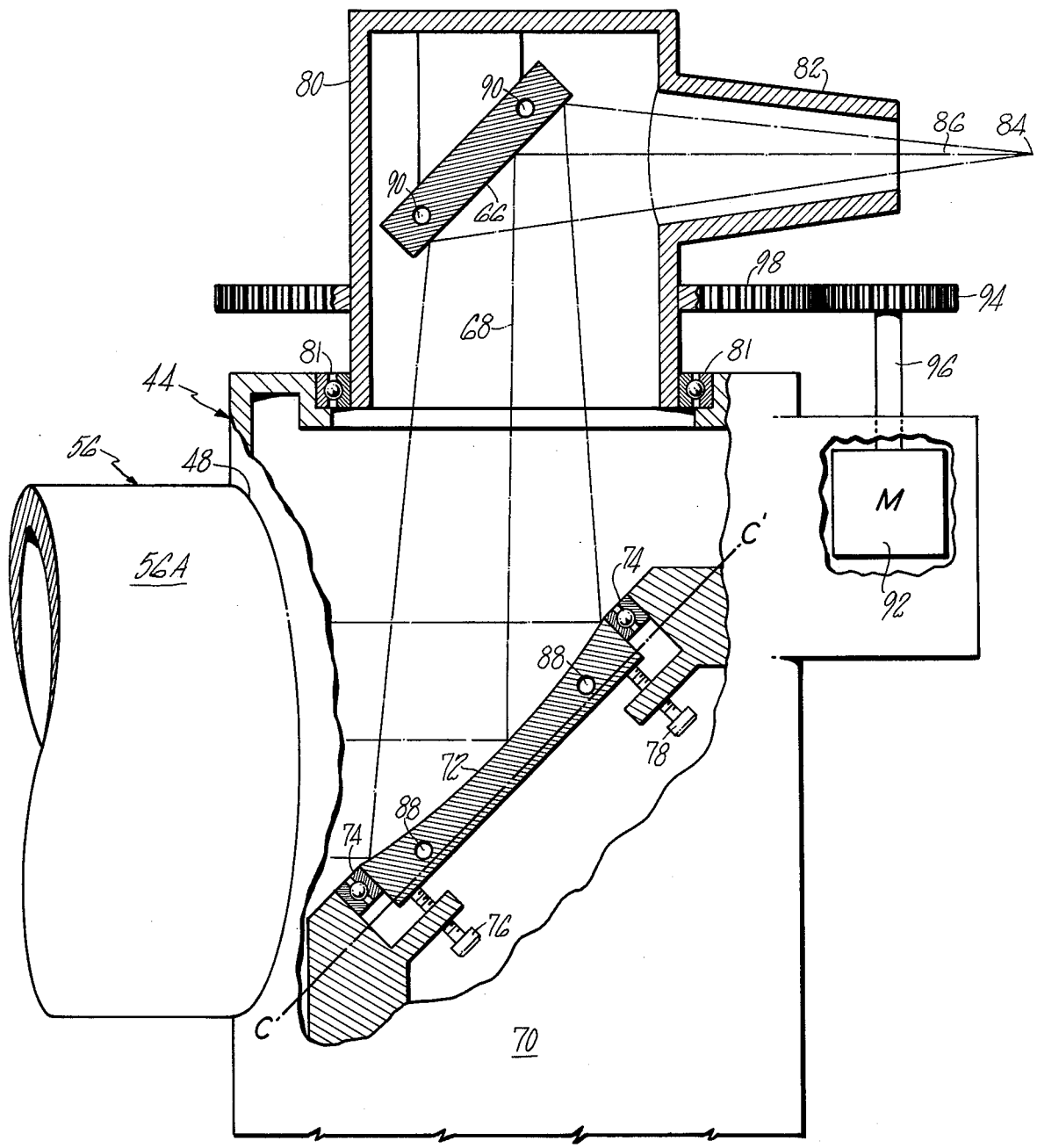

LASER BEAM WELDING APPARATUS

This invention generally relates to equipment for handling a beam of collimated radiation and particularly concerns an apparatus suited for in-place field application for controlling a laser beam and directing such a beam along a seam formed between abutting workpieces to be welded along the seam.

A primary object of this invention is to provide a new and improved welding apparatus for controlling a laser beam with reflective optics including an extendible and retractable mirror train to direct the beam from a fixed source to a rotatable focus head to move the beam relative to a stationary workpiece while the focus head maintains a desired condition of beam focus at the workpiece.

Another object of this invention is to provide such an apparatus which is of significantly simplified construction for field welding applications and which is particularly designed to minimize the number of reflectors required, even when the beam is moved circumferentially about a circular workpiece.

Yet another object of this invention is to provide a new and improved laser beam welding apparatus utilizing reflective optics having mirror train reflectors which are either stationary or permitted simple movement with one degree of freedom while yet achieving universal positioning of the focus spot of the output beam in a single plane.

A further object of this invention is to provide an apparatus of the above described type which may be oriented at a selected angle to the horizontal such that the apparatus in its entirety may be secured and operated at a predetermined angular working position relative to the workpiece, which may be angularly disposed relative to the horizontal, to ensure that the beam of radiation is directed in perpendicular relation to the workpiece.

Other objects will be in part obvious and in part pointed out more in detail hereinafter.

A better understanding of this invention will be obtained from the following detailed description and the accompanying drawings of an illustrative application of this invention.

In the drawings:

FIG. 3 is a simplified view, partly broken away and partly in section, showing a focus head utilized in the apparatus of FIG. 1.

Figures 1, 2:
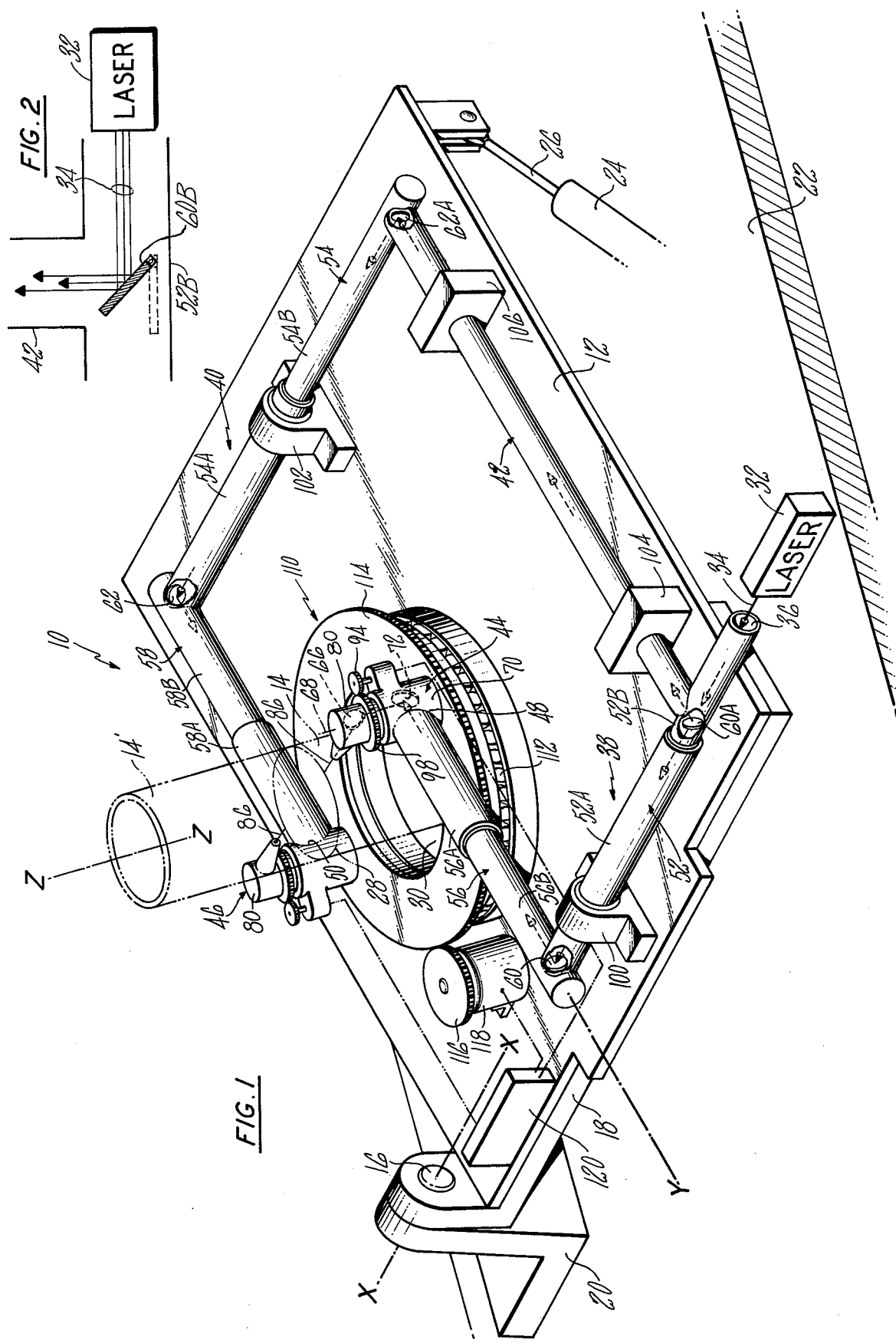
FIG. 1 is an isometric view, partly broken away, showing an apparatus incorporating this invention.
FIG. 2 is a sketch showing a translating mirror utilized in the apparatus of FIG. 1.

Referring to the drawings in detail, a welding apparatus 10 incorporating this invention is illustrated as being mounted on a platform 12 for high speed automated out-of-position welding of seams between abutting pipe lengths 14 and 14' at a single station. The platform 12 is supported for pivotal movement about an axis X—X established by a pivot pin 16 secured between lugs of a platform mounting bracket 18 and a support bracket 20 fixed to a base 22 of a supporting structure, e.g., the deck of a deep water pipe laying barge. To selectively position the platform 12 parallel to the deck 22 or at a selected angle thereto, a pair of power operated cylinders, only one shown at 24, each having an actuating piston rod such as shown at 26, are pivotally connected to a movable side of the platform 12 for selective adjustment of its attitude relative to the deck 22. The pipe lengths 14, 14' to be joined are shown with their seam 28 in abutting relation above the platform 12 with the lower pipe length 14 extending through an opening 30 in the platform. The pipe lengths will be understood to be of substantial length, considerably greater than the 40-foot lengths handled by conventional equipment, and are mounted in position at an arbitrary angle by conventional pipe support means, not illustrated, to permit the joined pipe lengths to be lowered into water at relatively steep angles, if desired. The disclosed structure permits adjustment of the platform 12 about pivot axis X—X to be in perpendicular relation to the pipe axis Z—Z.

The apparatus 10 of this invention serves to join abutting pipe lengths 14, 14' and provides a laser source, such as a conventional commercial carbon dioxide electric discharge laser 32, to discharge a collimated beam 34 of radiation along a fixed beam input axis coincident with pivot axis X—X of platform 12. The input beam 34 is directed along its input axis into an entrance 36 to a mirror train through which the beam is able to pass freely. The specifically illustrated mirror train includes a pair of right angle beam handling tubes 38 and 40 which are shown interconnected by a connector tube 42 for directing the beam 34 along two separate paths to focus heads 44 and 46 respectively secured at mirror train outlets 48 and 50 of the beam handling tubes 38 and 40.

More specifically, the beam handling tubes 38 and 40 each include an upstream duct section 52, 54 and a downstream duct section 56, 58 which are joined to one another with a translating reflector, 60 and 62, preferably a flat metal mirror, mounted at a juncture of the two duct sections for redirecting the incoming beam along two orthogonal axes perpendicular to the pipe axis Z—Z. I.e., the incoming beam is transmitted along a path extending in the X direction axially within the illustrated upstream duct section 52 and 54 of each tube 38 and 40 to a second axis in a Y direction which extends axially along the downstream duct section 56 and 58 of tubes 38 and 40.

In the specifically illustrated embodiment, a commercially available partially transmitting mirror 60A is shown mounted in a stationary position in the upstream duct section 52. The mirror 60A will be understood to transmit about 50% of the power of incoming beam 34 along upstream duct section 52 of tube 38, and the remaining power of the collimated radiation beam is reflected at right angles to axis X—X by mirror 60A to pass into the connector tube 42 from which the beam is redirected by a second stationary right angle turning mirror 62A into duct sections 54 and 58 leading to focus head 46.

To concentrate the beam onto a workpiece such as the seam 28 between the pipe lengths 14, 14' shown in broken lines in FIG. 1, the focus heads 44 and 46 each form a beam exit and are designed to direct a focused output beam along output axes contained in a common plane perpendicular to the pipe axis Z—Z. Each focus head 44 and 46 has an output reflector such as at 66 supported for rotation about an axis 68 extending in the Z direction to allow the focused output beam of each head 44 and 46 to be maintained in perpendicular relation to the seam 28 of the pipe lengths 14, 14' to be joined upon moving the heads 44 and 46 circumferentially about the pipe.

In the drawings, the same numbers are used to identify like parts of focus heads 44 and 46 which will be understood to be substantially identical. Each of the focus heads 44 and 46 include a lower housing 70 fixed at the mirror train outlets 48 and 50 to its respective downstream duct section 56 and 58. The lower housing 70 includes an internal focus mirror 72 which is shown mounted within lower housing 70 in a plane C–C' extending at a 45° angle to the axis 68. The focus mirror 72 is shown having a parabolic reflecting surface which is formed of metal and which is rotatably adjustable within mirror bearing 74 in plane C–C' to align the input axis of the parabolic mirror 72 with the geometric centerline of the focus head. Axial alignment of the mirror 72 is provided by mirror adjustment screws 76 and 78 which engage the back of the parabolic focus mirror 72 at convenient points to allow the mirror 72 to be tilted about two mutually perpendicular axes.

The lower housing 70 of each focus head supports an upper housing 80 for rotation within bearings 81, housing 80 serving to enclose the output reflector or turning mirror 66. The turning mirror 66 is a flat metal mirror fixed to the upper housing 80 and oriented therein to form a 45° angle with the intermediate axis 68. The converging beam leaving the parabolic focus mirror 72 strikes the turning mirror 66 which changes the direction of propagation of the converging beam 90° through a conical section 82 of the upper housing 80 to converge on an intended focus spot 84 located externally of each focus head on the beam output axis 86. Both the focus and turning mirrors 72, 76 are shown with coolant passages 88 and 90.

Accordingly, during use of each focus head 44 and 46, the incoming beam of collimated radiation is directed into each head along the axis of its downstream duct section 56 and 58 in the Y direction and is converged and redirected by focus mirror 72 along intermediate axis 68 to the turning mirror 66. The turning mirror 66 serves as an output reflector which is supported for rotation to direct the focused output beam along its output axis 86 to a focus spot 84 on the workpiece such as the seam 28 of pipe lengths 14, 14'.

To effect angular adjustment of the beam output axis 86 about the intermediate axis 68 of each focus head 44 and 46, a drive motor 92 is shown having an output gear 94 mounted on an output shaft 96 for meshing engagement with a drive gear 98 secured to the upper housing 80 of each focus head to thereby selectively adjust the orientation of the output reflector or turning mirror 66 and to accordingly rotate the focused output beam as desired to move the focus spot 84.

For example, the apparatus of this invention is particularly suited, while not being limited, to use in welding the illustrated seam 28 of abutting lengths of pipe. The adjusting drive motor 92 and drive gear connection 94 and 98 serve to adjust the orientation of the focus head output reflector 66, and thereby the output axis 86 of the focused output beam, perpendicular to the surface of the pipe joint to be welded, and the structure of the above described focus head permits the output beam to be directed to a focus spot on the joint to be welded as the focus head traverses a path of movement circumferentially about the pipe at a predetermined radial distance from its axis Z—Z.

To drive the focus heads 44 and 46 circumferentially about the workpiece surface while maintaining the integrity of the mirror train in an apparatus which minimizes beam alignment requirements and includes a minimum number of components and beam reflectors, the right angle beam handling tubes 38 and 40 each feature linear duct sections which are independently extendible and retractable along mutually perpendicular axes relative to their juncture with one another to locate the outlets of the mirror train relative to the seam 28 in timed relation to rotational movement of the focus heads 44 and 46 fixed to the mirror train outlets 48 and 50.

In the specifically illustrated embodiment, bearing blocks 100 and 102 are fixed to platform 12 and support the upstream duct sections 52 and 54, namely, tubes 52A and 54A respectively which are of enlarged diameter relative to entry tubes 52B and 54B which are shown telescoped within the tubes 52A and 54A. The latter are supported within bearing blocks 100 and 102 for linear movement axially of their entry tubes 52B and 54B which are fixed relative to platform 12 and interconnected by the connector tube 42 shown mounted in fixed relation to platform 12 on mounting blocks 104 and 106 secured to platform 12.

By virtue of the above described structure, the upper housings 80, 80 of focus heads 44, 46 are rotatable about their axes extending in the Z direction, and the downstream duct sections 56 and 58 and their respective affixed lower housings 70, 70 of focus heads 44 and 46 are mounted on an annular turntable 110 so as to move focus heads 44, 46 circumferentially about the pipe seam 28 and to permit each focus head housing 80 and its mirror 66 to rotate about its Z axis in timed relation to the turntable rotation. Turntable 110 is supported on platform 12 in concentric relation to platform opening 30 by any suitable means, such as the illustrated roller bearings 112, for rotation of the turntable 110 coaxially about pipe axis Z—Z. The focus heads 44 and 46 are shown mounted in diametrically opposed relation on the turntable 110 at a common fixed radius from axis Z—Z. The turntable 110 has a gear face 114 in meshing engagement with an output gear 116 of a suitable drive motor 118 mounted on platform 12.

Accordingly, upon operating the drive motors 118 and 92 for the turntable 110 and focus heads 44 and 46, the turntable 110 may be moved in a selected angular direction to rotate the focus heads 44, 46 about the pipe along paths of travel at a common fixed radius from the pipe axis Z—Z. The drive motors 92 and 118 may be any suitable commercially available motors with speed reducers, not shown, operatively connected between the motors and their respective output shafts. A suitable electrical control circuit 120 is provided for synchronizing the speed of the motors and reversing them to regulate the rotation of the turntable 110 in timed relation to the rotary movement of the upper housings 80, 80 of focus heads 44, 46 to continuously orient the focused output beams 86, 86 in perpendicular relation to the cylindrical workpiece surface along seam 28 responsive to the circumferential movement of the focus heads in their entirety about the workpiece. Movement of the focus heads 44, 46 upon rotation of the turntable 110 effects automatic linear extension and retraction of the right angle beam handling tubes 38 and 40 with a telescoping action of their respective upstream tubes 52A, 52B and 54A, 54B and downstream tubes 56A, 56B and 58A, 58B responsive to arcuate movement of the focus heads 44 and 46.

It will be recognized that the disclosed construction significantly simplifies beam alignment requirements since each translating mirror in the train is either fixed, such as mirror 62A or is limited to translational movement. I.e., mirrors 60, 62 mounted at the junctures of the right angle beam handling tubes 38, 40 are restricted to linear movement in the X direction along the path of movement of the upstream duct sections 52, 54 to continuously maintain the reflectors 60, 62 in alignment with the incoming beam propagating through upstream duct sections 52, 54 and in alignment with focus mirrors 72, 72 while allowing the distances between the optical elements to vary.

By virtue of the above-described structure, each focus head 44, 46 may readily traverse somewhat more than one-half the periphery of the cylindrical pipe joint to be welded before reversing the angular direction of turntable 110 to provide a desired but limited weld overlap. This is achieved by simply permitting rotation of the turntable 110 to rotate slightly more than 180° in each angular direction before turntable braking and reversal, as determined by the extent of welded joint overlap desired.

Obviously, details of the described embodiment may be modified while still achieving the objects of this invention. For example, the specific mounting arrangement, guide and support components for the duct sections may be varied; and the drive for the focus heads 44, 46 and beam handling tubes 38, 40 may be effected hydraulically, if desired. The right angle turning mirror 60A at the juncture of the connector tube 42 and entry tube 52B may be changed (FIG. 2) to simply provide a pivotally mounted turning mirror 60B having a non-transmitting, 100% reflective surface which is movable, e.g., between a first inoperative position and a second operating position to selectively direct the beam of radiation solely along one or another of the tubes 38 or 40 leading to focus heads 44 and 46. I.e., mirror 60B could be retracted (as seen in FIG. 2 in broken lines) from the path of the laser beam when the beam is to be directed to focus head 44. When welding with focus head 44 is completed, mirror 60B is automatically placed in its operating position to reflect the full laser beam 90° along tube 42 to direct the beam to focus head 46 to complete the seam weld. While this arrangement may require a somewhat longer weld time than the embodiment shown in FIG. 1, reduced laser power would be required with mirror 60B and hence, a smaller laser device would provide the desired results.

The disclosed apparatus provides a single station for welding pipe lengths considerably longer than the 40-foot lengths conventionally welded at seven or eight welding stations as normally used on pipe laying barges, for example. The capability to weld pipe joints with the pipe positioned at arbitrary angles to the horizontal in conjunction with a single station system permits the joined pipe to be lowered into water or a drilling bore, e.g., at a desirably steep angle. In addition to minimizing beam alignment problems by virtue of the laser beam translating mirrors each being located close to the supporting surface of the platform, the disclosed structure provides for rotating focused beams on the stationary workpiece with a minimum number of optical elements and mechanical complexity in a system which is particularly suited for field applications without need for filler wire and flux while yet achieving quality welds in a welding operation characterized by reduced production costs and increased productivity.

As will be apparent to persons skilled in the art, various modifications, adaptations and variations of the foregoing specific disclosure can be made without departing from the teachings of this invention.

We claim:

1. For directing a beam of radiation collimated about a fixed input axis to a joint to be welded between abutting stationary pipe lengths having a pipe axis extending at variable selected angles to the horizontal, an apparatus comprising an adjustable mounting platform having a pipe receiving opening therein, the platform being supported for swinging movement about a pivot axis for selectively locating the platform at a predetermined angular orientation to the horizontal, the mounting platform in said predetermined angular orientation to the horizontal being positioned in perpendicular relation to the pipe axis, a mirror train having an entrance, an outlet and a duct providing a passage therebetween for the beam of radiation, a focus head on the outlet mounted on the platform at a predetermined fixed radial distance from the pipe axis for movement circumferentially about the outside of the pipe joint to be welded for directing a focused output beam along a selected output axis extending in substantially perpendicular relation to the pipe axis to a focus spot on the pipe joint, the duct having upstream and downstream linear sections joined to one another at a juncture thereof, the mirror train including a reflector mounted in said juncture for redirecting the beam from a first axis extending along the upstream section of the duct to a second axis extending along its downstream section, and positioning means for moving the duct juncture and reflector therein along said first beam axis in timed relation to movement of the focus head about the pipe to effect focus head positioning relative to the pipe.

2. The apparatus of claim 1 wherein the upstream and downstream duct sections each are independently extendible and retractable relative to their juncture respectively along said first and second beam axes.

3. The apparatus of claim 1 wherein the duct sections are joined in perpendicular relation for independent linear extension and retraction relative to their juncture respectively along perpendicular first and second beam axes.

4. The apparatus of claim 3 wherein the focus head is supported for movement along a path in radially offset relation to an axis of the pipe extending perpendicular to a plane containing said first and second beam axes, wherein the focus head includes an output reflector supported for rotation about a rotational axis in offset parallel relation to the pipe axis, and wherein the focus head includes means for orienting the output reflector in timed relation to movement of the focus head to locate the output axis of the focused output beam perpendicular to the pipe joint in a plane parallel to said plane containing said first and second beam axes.

5. The apparatus of claim 1 wherein the mirror train includes a second outlet, a second duct connecting the second outlet to the mirror train entrance, and reflector means in the second duct for directing the beam from the mirror train entrance to the second outlet, and wherein a second focus head is provided on the second outlet mounted on the platform for circumferential movement about the pipe joint, the second focus head having a rotatably supported output reflector for directing a focused output beam along a second output axis onto the pipe joint.

6. The apparatus of claim 5 wherein the second duct includes upstream and downstream linear sections joined to one another, and wherein the reflector means in the second duct includes a second reflector mounted at a juncture of the sections of the second duct for redirecting the beam from a first axis extending along the upstream section of the second duct to a second axis extending along its downstream section.

7. The apparatus of claim 6 wherein the second duct juncture and reflector therein are movable by the positioning means along said first beam axis of the upstream section of the second duct in timed relation to arcuate movement of the second focus head to effect positioning of the second focus head relative to the pipe joint.

8. The apparatus of claim 7 further including means for supporting and guiding the first and second focus heads between first and second terminal positions respectively along first and second circular paths of movement jointly defining a circle, the paths of focus head movement terminating in lapping relation to one another.

9. The apparatus of claim 5 wherein the first and second ducts are joined to one another by a connecting tube, and wherein upstream and downstream reflectors are mounted at opposite ends of the tube at its juncture with the first and second ducts, respectively, for directing the beam from the mirror train entrance to the second duct.

10. The apparatus of claim 9 wherein the upstream reflector is a partially transmitting turning mirror coacting with the first and second duct reflector means for simultaneously directing the power of the laser beam to the first and second outlets to provide first and second output beams simultaneously directed onto the pipe joint.

11. The apparatus of claim 9 wherein the upstream reflector has a non-transmitting reflective surface movable between first and second position, whereby the beam is selectively directed to the first and second ducts, alternatively.

12. The apparatus of claim 1 wherein the platform pivot axis is coincident with the beam input axis.

13. The apparatus of claim 1 further including first means on the platform for supporting and guiding the duct sections for rectilinear movement relative to one another upon movement of the duct juncture and reflector therein along said first beam axis, and second means on the platform for supporting and guiding the focus head for circumferential movement about the pipe joint in timed relation to movement of the duct sections.

* * * * *